United States Patent [19]

Kojima

[11] 4,181,330
[45] Jan. 1, 1980

[54] HORN SHAPED MULTI-INLET PIPE FITTING

[76] Inventor: Noriatsu Kojima, 31, Yanagishima-cho 5-chome, Nakagawa-ku, Nagoya, Aichi, Japan

[21] Appl. No.: 780,107

[22] Filed: Mar. 22, 1977

[51] Int. Cl.² .................................................. F16L 43/00
[52] U.S. Cl. ..................................... 285/127; 285/64; 285/177
[58] Field of Search ................... 285/127, 177, 61, 64

[56] References Cited

U.S. PATENT DOCUMENTS

| 278,723 | 6/1883 | Monteath | 285/177 |
| 733,475 | 7/1903 | Foley | 285/64 X |
| 954,852 | 4/1910 | Colombo | 285/61 X |
| 1,760,224 | 5/1930 | Wray | 285/61 |
| 1,969,043 | 8/1934 | Sharp | 285/61 X |
| 3,944,261 | 3/1976 | Reed et al. | 285/137 R X |

Primary Examiner—Wayne L. Shedd
Attorney, Agent, or Firm—Irvin A. Lavine

[57] ABSTRACT

A horn shaped multi-inlet pipe joint for connecting a vertical pipe or pipes to a horizontal main pipe. The pipe joint comprises a horn shaped body in which a clearance is formed for diffusing drainage from the pipes and a chute surface is provided for collecting the diffused drainage and leading it to the main pipe, and a cap having a plurality of openings to which the vertical pipe or pipes, a cleaning access lid or lids and the like are attached.

6 Claims, 11 Drawing Figures

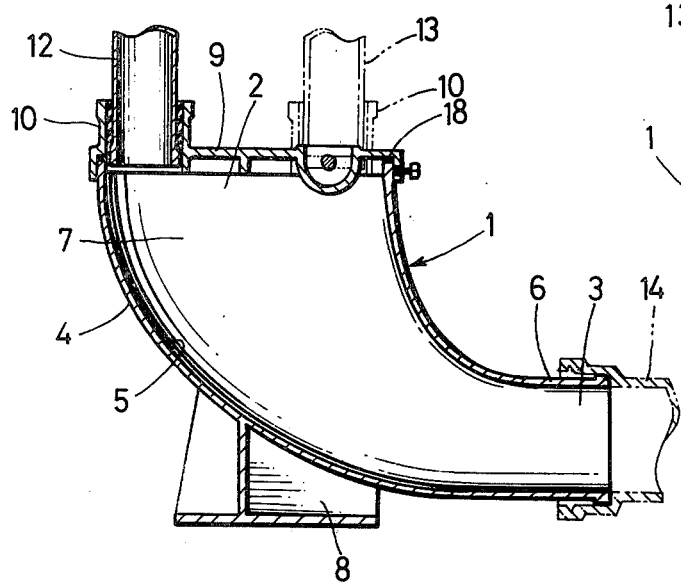
Fig. 1
Fig. 2
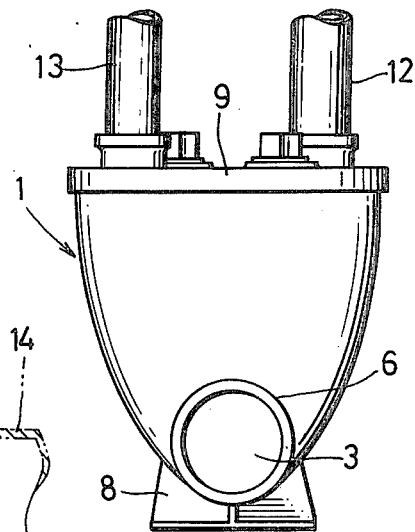
Fig. 3
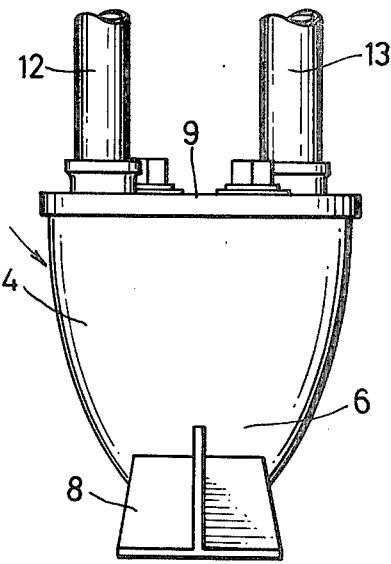
Fig. 4

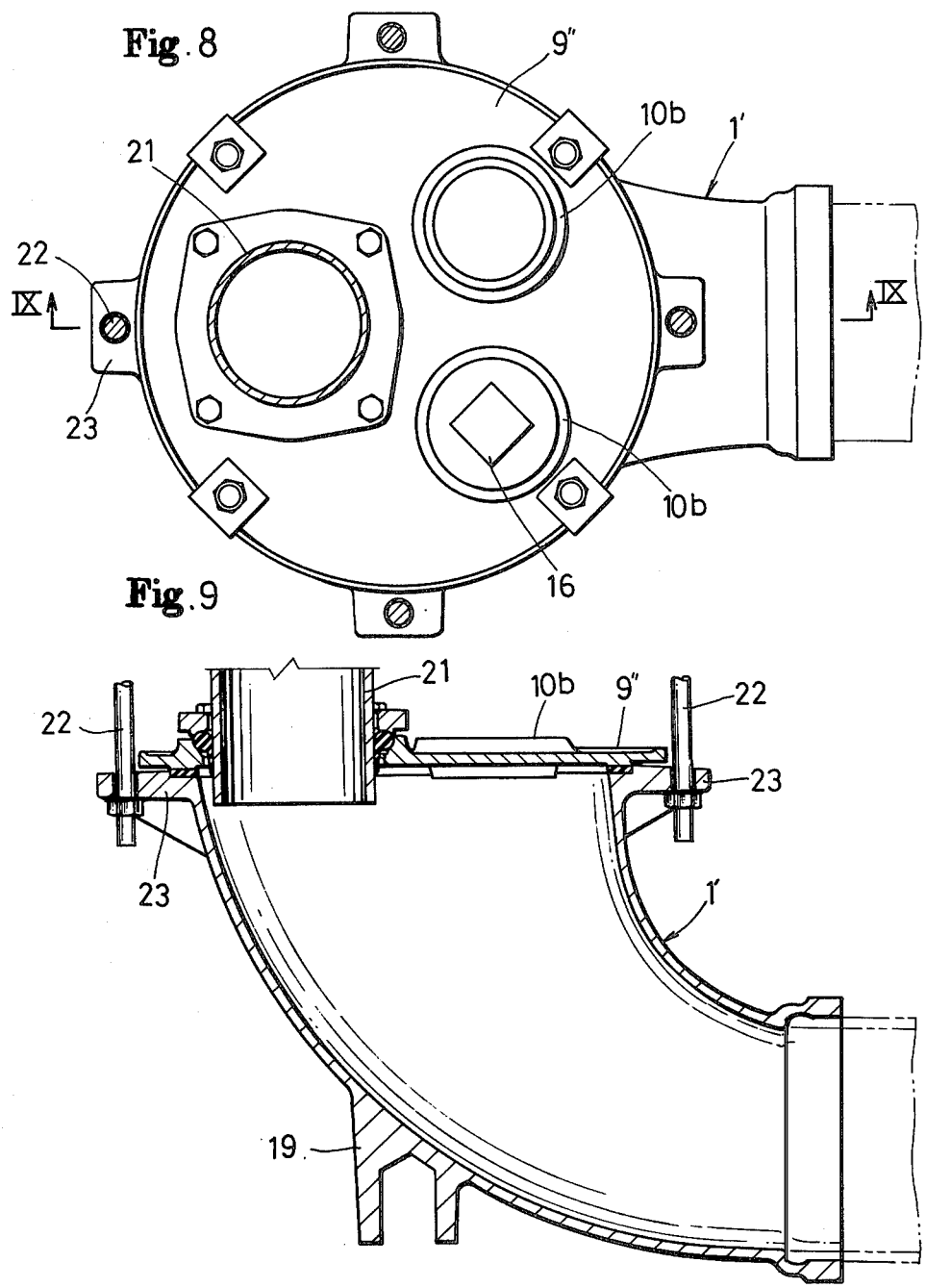

HORN SHAPED MULTI-INLET PIPE FITTING

This invention relates to a horn shaped multi-inlet pipe joint for connecting a vertical pipe or pipes to a horizontal main pipe.

In drainage piping, there has been employed a 90° elbow for connecting a vertical pipe to a horizontal main pipe. But the known piping has difficulty in easy flow of drainage and ventilation. Fluid flows down in a screen into the 90° elbow and blocks the horizontal pipe against air flow therethrough, causing increase of air pressure in the vertical pipe. This increase in air pressure often prevents smooth flow of drainage through the vertical pipe, and causes water, foam of cleaning material or stench to leak out from traps on horizontal pipes connected into the vertical pipe at different levels of height along a building or the like.

In order to settle the problem, various devices have been proposed to disperse a fluid screen of drainage in the elbow, such as one having a crushing projection. The elbow having such a projection, however, is apt to be choked with materials contained in the drainage and caught on the projection.

There have been also proposed spherical or semi-spherical pipe joints. Drainage flow from the vertical pipe is diffused in an enlarged clearance in the joint, whereby fluid screen is diffused, and air in the fluid flow can freely escape. Thus, the spherical or semi-spherical joint is efficient in reducing fluctuation of air pressure in the pipes. As the joint, however, has an unappropriately curved face at the portion defined by the side wall and the bottom, fluid flow is apt to be stagnant at that portion and materials contained in the drainage will adhere thereto, causing choking of the pipe joint.

In usual cases, such an elbow or pipe joint as described above has been employed for a vertical pipe in each of various drainage lines, such as sewage and miscellaneous drainage lines, so a lot of piping materials and troublesome piping work have been required, making construction of such drainage lines very costly.

This invention proposes a pipe joint which can overcome the above mentioned defects of the known pipe joint.

An object of this invention is to provide a horn shaped multi-inlet pipe joint having a clearance large enough to diffuse fluid flow therein in order to maintain free air flow in the connected pipes as well as free fluid flow, so that drainage, foam of cleaning material or stench will not flow out through traps.

Another object of this invention is to provide a horn shaped multi-inlet pipe joint which permits free flow of drainage therethrough without being choked with materials contained therein.

A further object of this invention is to provide a horn shaped multi-inlet pipe joint by which a plurality of vertical pipes can be connected to a horizontal main pipe in order to save piping material and piping work, as well as piping space.

These objects are attained by this invention which provides a horn shaped multi-inlet pipe joint for connecting a vertical pipe or pipes to a horizontal main pipe, said pipe joint comprising, a horn shaped body formed by a downwardly tapered and curved wall of circular cross-section having an inlet port, an outlet port, a clearance for diffusing drainage from said vertical pipe and a chute face formed below said inlet port for collecting said diffused drainage and leading it to said main pipe, said inlet port having a larger diameter than said outlet port, a base on which said body is supported, and a cap covering said inlet port in a sealing manner and having a plurality of openings to which said vertical pipes and at least one access lid are connected.

FIG. 1 is a vertical sectional view taken on line I—I of FIG. 2 of an embodiment of the horn shaped multi-inlet pipe joint according to this invention.

FIG. 2 is a top plane view of the pipe joint shown in FIG. 1.

FIG. 3 is an elevational view of the pipe joint showing an outlet port.

FIG. 4 is a rear elevational view of the pipe joint.

FIG. 8 is a top plane view of a fourth embodiment of the pipe joint.

FIG. 9 is a vertical sectional view taken on the line IX—IX of FIG. 8.

Figure 11:
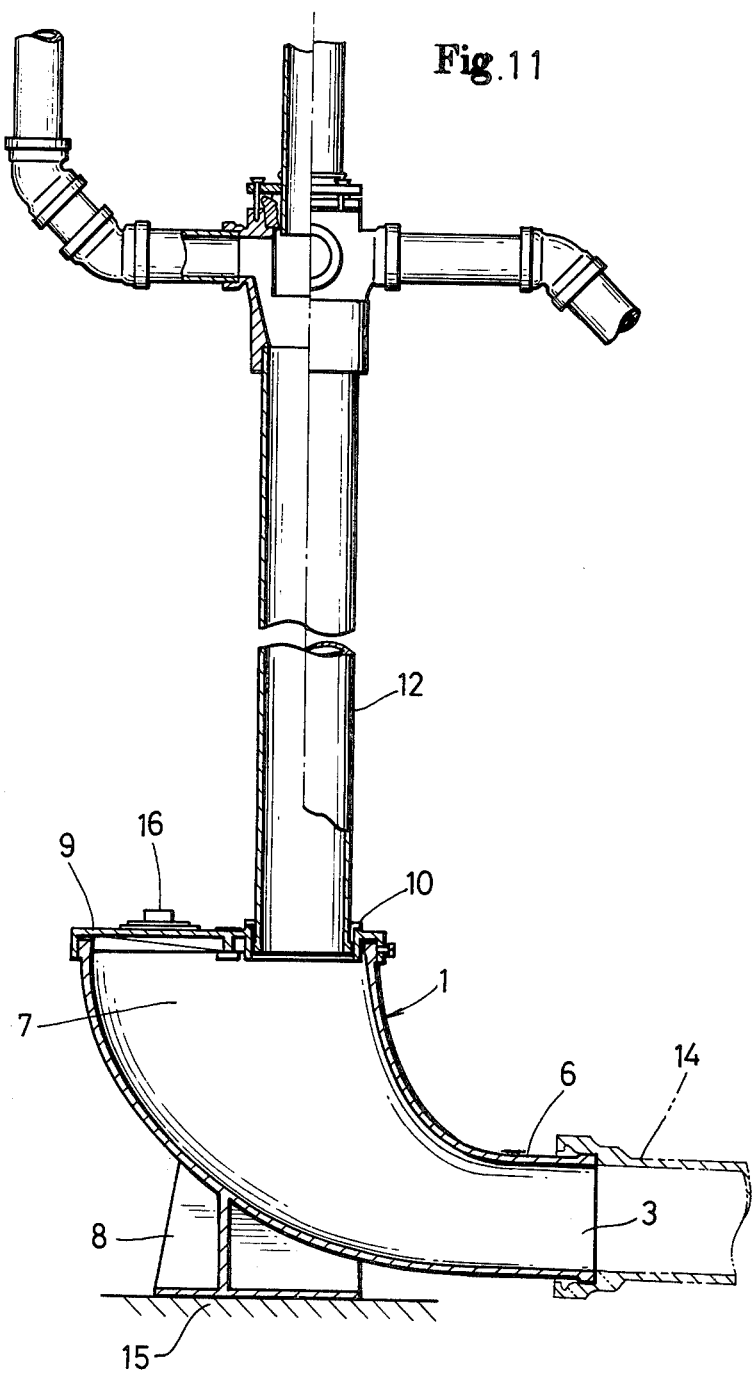
FIG. 11 is a view illustrating the usage of the horn shaped multi-inlet pipe joint according to this invention.

In FIGS. 1, 2, 3 and 4, the horn shaped multi-inlet pipe joint comprises a horn shaped body 1 which has at the top end thereof an inlet port 2 of a relatively larger round cross-section than that of an outlet port 3, and an enlarged clearance 7 in which drainage from vertical pipes 12 and 13 is diffused. The clearance 7 is gradually tapering or constricted toward a pipe portion 6 having a round cross-section, in which the outlet port 3 is formed. The side wall 4 of the body forms at the inner surface thereof a chute face 5 on which drainage with solid or like materials contained therein or foam of cleaning material or air fall to be led downstream. There is provided at the bottom portion of the side wall 4 a base 8 employable to fix the body 1 on a floor 15 (FIG. 11) or the like.

The inlet port 2 of the body 1 is covered with a cap 9. The cap 9 has a pair of openings to which vertical drainage pipes, such as a sewage pipe 12 and a miscellaneous drainage pipe 13, are connected, a pair of lifting lugs 11 employable to remove the cap 9, and a pair of access lids 16 through which the interior of the body 1 can be cleaned.

Figure 5:
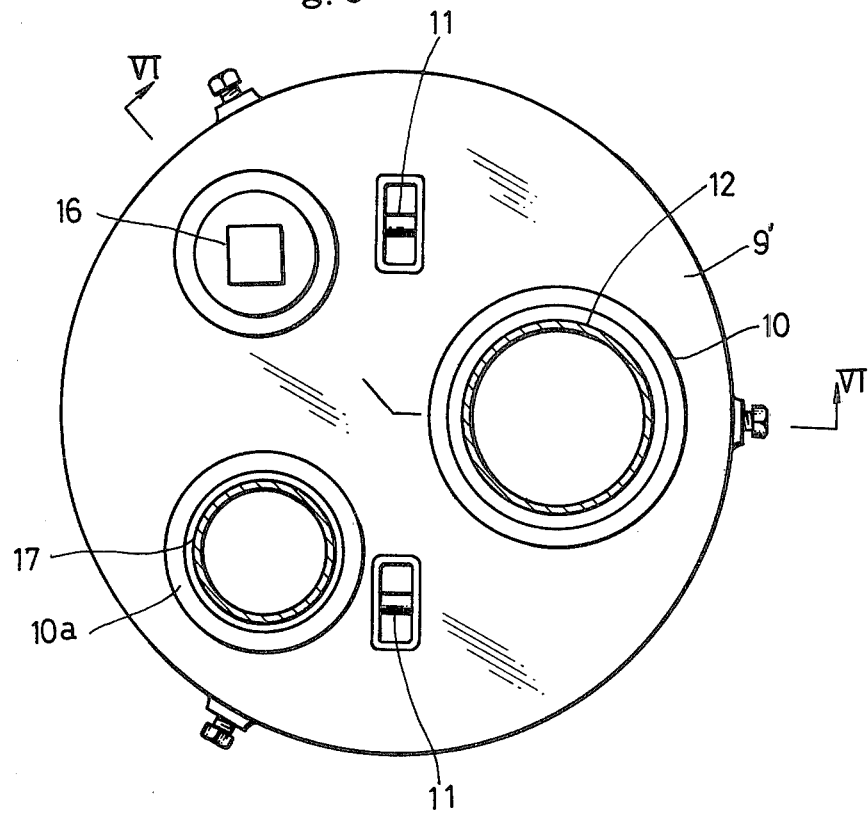
FIG. 5 is a fragmentary top plane view of another embodiment of the pipe joint.
Figure 6:
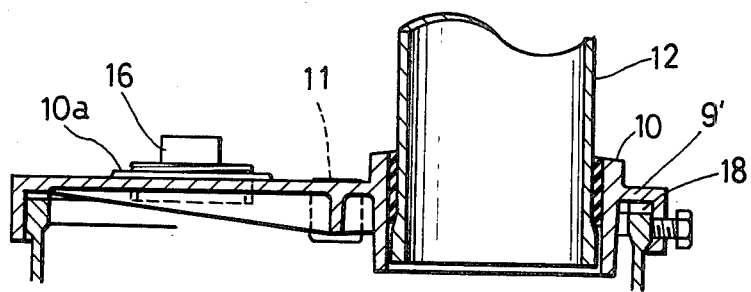
FIG. 6 is a vertical sectional view taken on the line VI—VI of FIG. 5.

The cap 9' shown in FIG. 5 has an opening 10 for connecting the sewage pipe 12, a pair of lifting lugs 11 and an access lid 16, and another opening 10a for connecting another drainage pipe or a vent pipe.

A horizontal main pipe 14 is connected to the outlet port 3 of the body 1 at approximately right angles to the sewage pipe 12 and the miscellaneous drainage pipe 13 with such a downward gradient as to permit smooth flow of drainage into the pipe 14.

Figure 7:
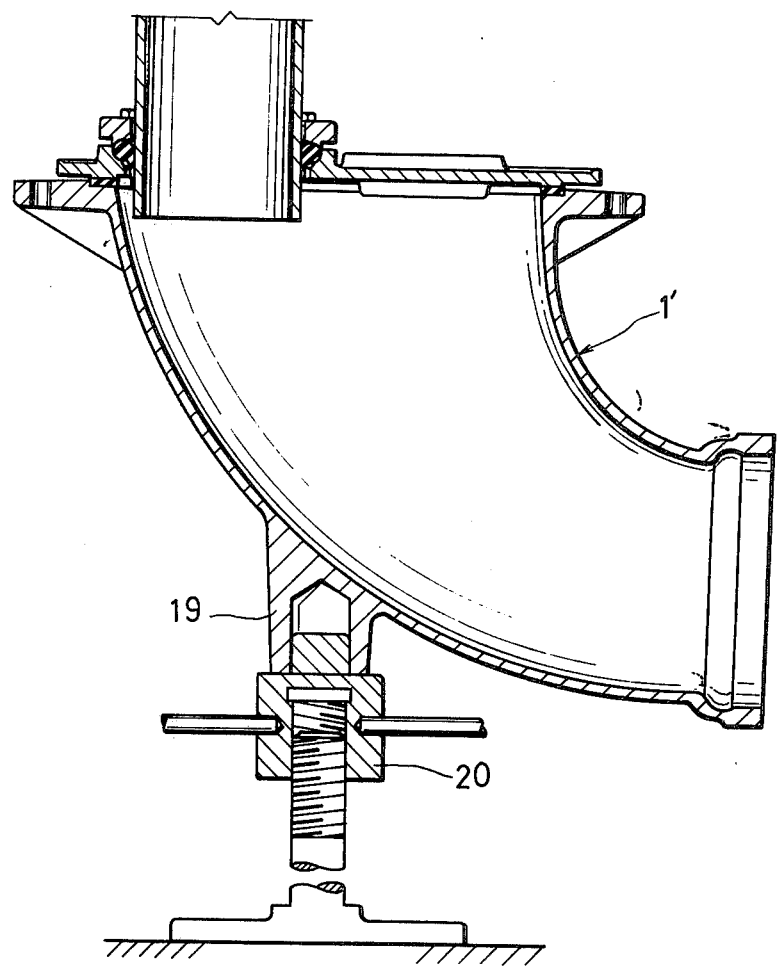
FIG. 7 is a vertical sectional view of a third embodiment of the pipe joint.
Figure 10:
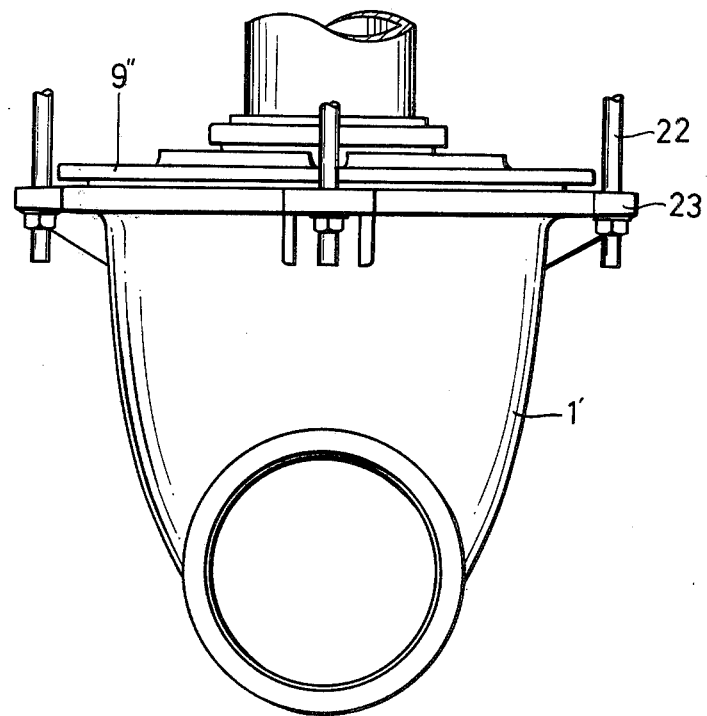
FIG. 10 is a front elevational view of the pipe joint in FIG. 8, showing an outlet port.

The body 1' in FIG. 7 is provided with a recessed leg 19 in place of the base 8 in FIG. 1. A jack 20 is mounted in the recessed leg 19 for adjustably lifting the body 1'.

It is preferable to use the opening 10a for connecting a vertical pipe in such cases as mentioned below.

(1) In case sanitary equipment is placed far apart from other equipment, it is economically and technically disadvantageous to collect drainage from all the sanitary equipment only through one or two vertical pipelines, because horizontal branch pipes connecting the equipment extends too long. As the horizontal branch pipes should be installed with a predetermined downward gradient for smooth flow of drainage, the full length of such a long horizontal branch pipe cannot be accommodated in the space between the floor of one story and the ceiling of another.

(2) In drainage piping equipment for a multi-storied building, piping at upper stories is usually under negative pressure, and piping at lower stories is under positive pressure. Especially, in case drainage contains foam of cleaning material, the piping will be under high pressure, so that foam will flow out through traps provided at lower stories. For that reason, separate routes of vertical pipes are provided for carrying drainage from upper stories and that from lower stories.

The pipe joint shown in FIGS. 8 and 9 is employable for drainage piping connection between the stories of a multi-storied building. A vertical pipe 21 mounted on a cap 9" carries together sewage and other drainage from higher stories. The cap 9" has a pair of openings 10b for pipes which carry sewage and/or other drainage from lower stories. One or both of the openings 10b are alternatively employable for connecting a vertical vent pipe or a bypass vent pipe extending to the main pipe 14 or the vertical drainage pipe 21, or as cleaning accesses provided with lids 16.

The pipe joint according to this invention is employed at a lower story of a multi-storied building by mounting the base 8 of the body 1 on the floor of the story. Alternatively it may be suspended by suspension means, such as suspension flanges 23 and bolts 22 as shown in FIGS. 8 and 9 from the ceiling, when the story is, for example, a garage. The cap 9 is mounted on the top end of the body 1 and sealed against it by packing material 18. The body 1 is placed so that the top end thereof lies approximately in a horizontal plane. The sewage pipe 12 and the miscellaneous drainage pipe 13 are vertically connected to the openings 10 of the cap 9 in a sealing manner. The horizontal main pipe 14 is sealingly connected to the outlet port 3 of the body 1 approximately at right angles to the sewage pipe 12 and the other drainage pipe 13.

Sewage and other drainage from the stories are gathered in the sewage pipe 12 and the miscellaneous drainage pipe 13, respectively and run down therein into the body 1 of the pipe joint. The drainage is then diffused in the enlarged, open clearance 7 in the body 1, wherein the fluid screen formed in the upstream pipes 12 and 13 is dispersed, so that sewage, other drainage or foam of cleaning material and air can be separated from fluid. The dispersed sewage and other material smoothly flow on the chute face 5 to the outlet port 3 along with drainage fluid. The drainage, then, flows in the horizontal main pipe 14 without spattering. As air contained in the drainage can freely flow in the main pipe 14, fluctuation of pressure in the connected pipes is considerably reduced, so that there is no leakage of drainage, foam of cleaning material or stench from the drainage traps. In case a vent pipe 17 is equipped, part of the air will flow out therethrough.

Sewage and other drainage are carried by a plurality of separate vertical pipes or a single vertical pipe together. In case they are carried by a single pipe, a body having an inlet port of smaller diameter and a cap having a smaller number of openings may be employed.

What is claimed is:

1. A pipe joint comprising:
   a body having a substantially horizontal inlet of relatively large size and a substantially vertical outlet of relatively small size,
   the outlet adapted to have an outlet pipe connected to it,
   connecting cap means on said body at said inlet for connecting a pipe of small size compared to the inlet to said body and for effecting discharge of material from the pipe into the body adjacent the inlet thereof,
   said body characterized by:
   (a) a curved wall extending from said inlet and converging to said outlet and having a face thereof beneath the pipe for receiving material discharged from the pipe and changing the direction of movement thereof from substantially vertical to substantially horizontal, and
   (b) a clearance space in said body laterally of the entrance for material discharged thereinto from the pipe, said clearance space being free of impediment to the lateral movement of gases discharged from the pipe, thereby enabling gases associated with the liquid flowing into the joint from the pipe to be separated therefrom, and providing communication of both air and liquid between a pipe connected to the outlet, the pipe joint and a pipe connected to the inlet.

2. The pipe joint of claim 1, said cap comprising plural pipe receiving means, of substantially smaller diameter than said inlet port.

3. The pipe joint of claim 1, and a base for supporting said body.

4. The pipe joint as claimed in claim 3, wherein said base comprises a recessed leg structure in which a jack is mountable for lifting said body.

5. The pipe joint as claimed in claim 3, wherein said body includes suspension means.

6. The pipe joint as claimed in claim 5, wherein said suspension means comprises a plurality of apertured lugs radially outwardly projecting from said body and a plurality of vertical bolts each extending through one of said lugs.

* * * * *